UNITED STATES PATENT OFFICE.

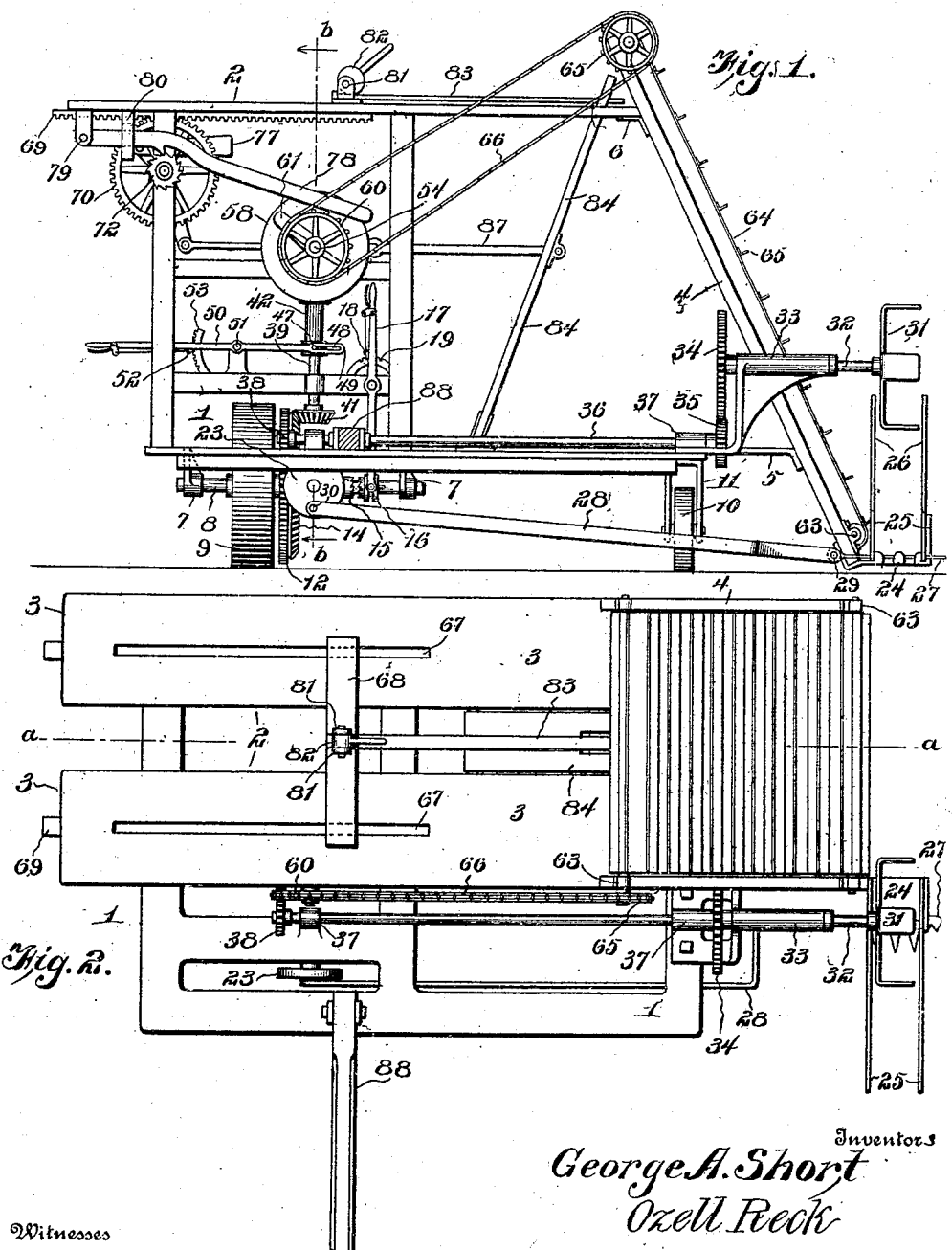

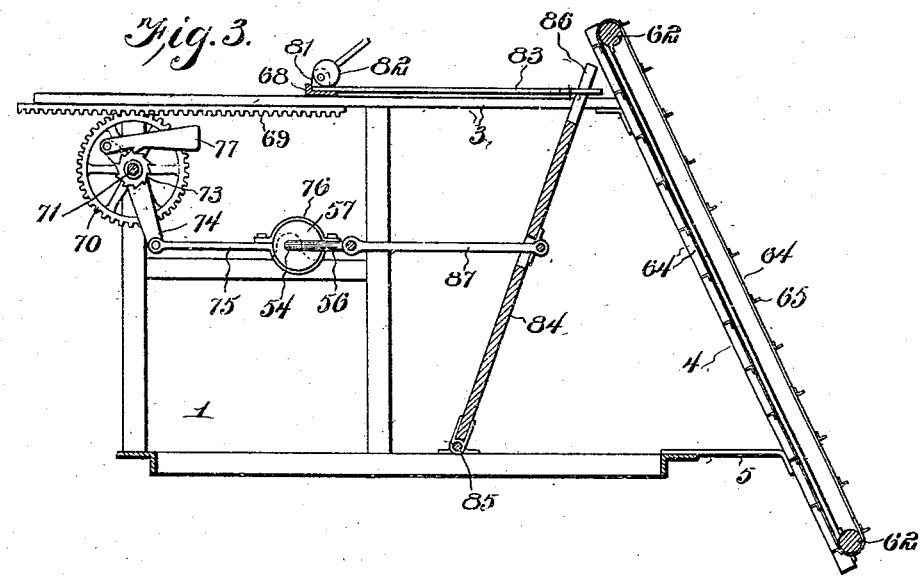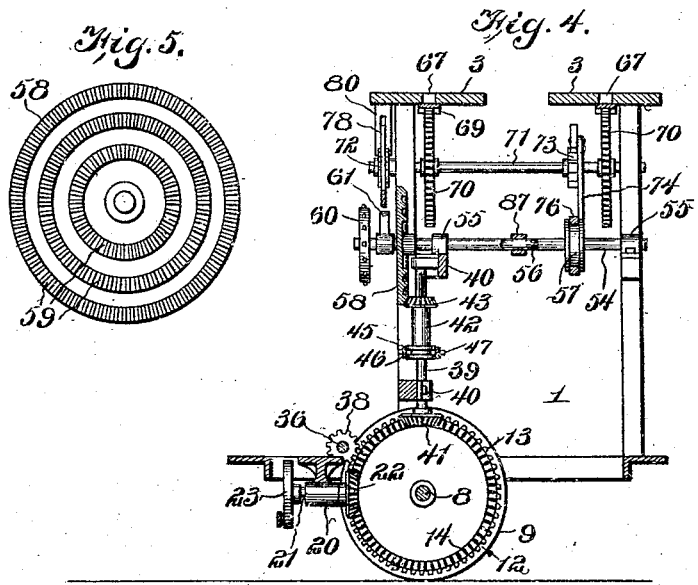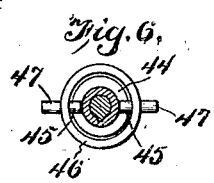

GEORGE A. SHORT AND OZELL RECK, OF WEST MILTON, OHIO.

HARVESTING-MACHINE.

No. 908,342.  Specification of Letters Patent.  Patented Dec. 29, 1908.

Application filed June 15, 1907. Serial No. 379,225.

*To all whom it may concern:*

Be it known that we, GEORGE A. SHORT and OZELL RECK, citizens of the United States of America, residing at West Milton, in the county of Miami and State of Ohio, have invented new and useful Improvements in Harvesting-Machines, of which the following is a specification.

This invention is an improved tobacco harvesting and spudding machine, and it consists in the construction, combination and arrangement of devices hereinafter described and claimed.

One object of the invention is to provide improved means for cutting and harvesting the tobacco.

A further object is to provide improved means, operative simultaneously in the harvesting mechanism for spudding the tobacco, as the same is elevated after having been cut by the harvesting mechanism.

In the accompanying drawings,—Figure 1 is a front elevation of a tobacco harvesting and spudding machine constructed in accordance with this invention. Fig. 2 is a top plan view of the same. Fig. 3 is a vertical transverse sectional view taken on the plane indicated by the line a—a of Fig. 2. Fig. 4 is a vertical longitudinal sectional view taken on the plane indicated by the line b—b of Fig. 1. Fig. 5 is a detail elevation of the master gear. Fig. 6 is a detail view.

The main frame 1 may be of the construction here shown, or of any other suitable construction. The same is provided with an elevated table 2 comprising parallel transversely disposed members 3 which extend from one side of said main frame, and at the opposite side of said main frame is a laterally inclined elevator frame 4, the lower end of which is attached to such main frame by an arm or bracket 5 and the upper portion of which is attached to the table members 3 by brackets 6. A pair of bearing standards 7 depend from the main frame at a suitable point near one end thereof, and a shaft 8 is journaled in said bearing standards and is provided with a supporting and driving wheel 9. A smaller wheel 10 is disposed opposite the wheel 9 at a suitable distance therefrom and has its bearings in a standard yoke 11 which depends from the lower portion of the main frame 1. A master gear wheel 12 is loosely mounted on the shaft 8 and is provided with peripheral spurs 13 and is also provided on one side with a beveled gear portion 14. Such master gear is further provided with a clutch member 15. A clutch member 16 is splined or otherwise suitably secured to the shaft 8 for rotation therewith and longitudinal movement thereon to enable it to be engaged with or disengaged from the clutch member 15 to lock such master gear to such shaft to permit the latter to rotate independently of such master gear. A shipping lever 17 is employed to operate the clutch member 16 and is here shown as provided with a locking dog 18 of usual construction, which in coaction with a segment 19 serves to lock such shipping lever at any desired adjustment.

Under the front portion of the main frame 1 is a bearing 20 for a short longitudinally disposed shaft 21 which is provided at its rear end with a beveled gear 22 that engages the beveled gear teeth of the master gear 12. At the front end of such shaft is a crank disk 23.

To the lower end of the front portion of the elevator frame is secured a finger bar or plate 24. A pair of longitudinally disposed arms 25 extend forwardly from such finger bar or plate at points near the ends thereof, and a pair of vertically disposed arms 26 also extend upwardly from such finger bar or plate near the ends thereof. A suitable cutter bar or plate 27 is provided which is mounted to reciprocate on the finger bar or plate and to coact therewith in cutting the plants of a tobacco row when the machine is in motion, longitudinally extending arms 25 being caused to move on opposite sides of such row. A pitman 28 is pivotally connected to the inner end of such bar or plate, as at 29, and is also connected to the crank disk 23 by a wrist pin 30.

Above the cutting apparatus is a revoluble rail 31 which serves to direct the cut plants rearwardly and to cause them to fall on the flights of the elevator hereinafter described. Such rail has a shaft 32 mounted in a bar 33 with which the frame 1 is provided, and at the inner end of the said shaft is a spur gear 34. Such gear is engaged by a pinion 35 on a shaft 36 which is journaled in bearings 37 on the main frame and is provided at one end with a pinion 38 that engages the spur geared portion of the master gear 12. Hence the wheel is driven when the machine is in motion, as will be understood.

A vertically disposed shaft 39 is journaled in bearings 40, with which the frame 1 is provided. Such shaft has a beveled pinion 41 at its lower end which engages the beveled gear portion of the master gear 12, and hence such shaft 39 is driven by such master gear. A sleeve 42 is splined or otherwise suitably connected to the shaft 39 for rotation therewith and longitudinal movement thereon, and is provided at its upper end with a suitable gear 43, and has at its lower end an enlarged portion provided with an annular circumferential groove 44, which groove is engaged by pins 45 that project inwardly from opposite sides of a collar 46. Such collar is also provided with outwardly projecting pins 47 which operate in slots 48 of the bifurcated arms 49 of a shipping lever 50. The fulcrum of such lever is indicated at 51, and such lever is shown as provided with a locking dog 52 of the usual construction which coacts with a segment bar 53 to secure such shipping lever and hence such sleeve 42 at any desired adjustment.

A longitudinally disposed shaft 54 is journaled in bearings 55 with which the main frame is provided. Such shaft has a crank portion 56. An eccentric 57 is secured to such shaft. A speed regulating gear 58 is secured to such shaft and is provided on one side with concentric series of gear teeth 59 for engagement by the gear 43, and as the latter is shifted across the lower portion of the face of such gear 58 so that it may be engaged with either of the series of gear teeth 59, it will be understood that the shaft 54 may be driven at varying rates of speed. A sprocket wheel 60 is secured to the front end of the shaft 54. A trip arm 61 is also secured to such shaft near its front end and extends radially therefrom.

At the upper and lower ends of the elevator frame are mounted roller shafts 62 and suitable bearings, such as shown at 63 in Fig. 1. Such roller shafts are connected by an endless elevator belt 64 which is provided with flights 65. The upper roller shaft 62 is provided at its front end with a sprocket wheel 65' which is connected to and driven from the sprocket wheel 60 by an endless sprocket pinion 66. Hence the endless elevator is driven, as will be understood, and serves to carry up the tobacco plants which are cut by the cutting apparatus and to drop such tobacco plants on the table 2 and across the longitudinal space formed between the members 3 of such table. Each member 3 of the table, which is termed the "spudding" table, is provided with a slot 67.

A bar or head 68 is disposed longitudinally with respect to the machine and transversely with respect to the spudding table, bears and is slidable on the members 3, and such spudding table is provided with depending guide portions which operate in the slots 67 and is further provided with rack bars 69 which operate on the lower sides of the table members 3. Such rack bars are engaged by pinions 70 on a shaft 71 which has its bearings in the frame 1 and is provided at its front end with a ratchet wheel 72 and at a suitable distance from its rear end with a ratchet wheel 73. A rock arm 74 oscillates on the shaft 71 and is operated by an eccentric rod 75 and an eccentric strap 76, the latter engaging the eccentric 57. Such rocking arm carries a gravitating pawl 77 which coacts with the ratchet 73 to revolve the shaft 71 by a step-by-step movement so as to cause the pinion 70 and rack bar 69 to move the bar 68 outwardly a slight distance at each rotation of the shaft 71. A gravity-acting pawl 78 is pivotally mounted, as at 79, operates in a guide 80 that depends from the table 2 and normally engages the ratchet wheel 72 to lock the shaft 71 against rotation. Such pawl 78 has an arm which extends therefrom and is disposed in the path of the trip arm 61 so that the latter once during each rotation of the shaft 54 lifts the said pawl 78 out of engagement with the ratchet wheel 72 and hence permits the shaft 71 to be partly turned in one direction, as before stated, by the coaction of the locking arm 74, the ratchet wheel 73 and the pawl 77. Hence while the bar 68 is caused to move outwardly to a slight extent at intervals, such movement is regulated and controlled, and such bar can move only a slight distance at suitable intervals of time.

The bar 68 is provided with bearings 81 for an eccentric clamp 82. Such clamp coacts with the bar 68 to detachably secure a spudding lath 83 to such spudding bar or head 68 over the space or opening between the members 3 of the spudding table for movement with and by such spudding bar 68. It will be understood that as the cut tobacco plants fall from the upper portion of the elevator on to the spudding table, they will lie across such lath 83.

An oscillating spudding arm 84 has its lower end pivotally connected to the frame 1, as at 85. Its upper end operates in the slot or space between the members 3 of the spudding table and is provided with a vertical open slot 86 to clear the lath 83. Such spudding arm is connected to the wrist of the crank portion 56 of the shaft 54 by a pitman 87 and hence is caused to oscillate when such shaft is in rotation and the machine is in motion, the spudding arm serving at each out stroke to drive up and spud the tobacco previously deposited across such lath by the action of the elevator.

A tongue 88 is attached to the front portion of the frame 1 and extends therefrom to enable the machine to be drawn by a team.

Having thus described the invention, what is claimed as new, is:—

1. A tobacco harvesting mechanism having a spudding table, means to deliver the cut tobacco on such spudding table, a reciprocating spudding element, means to support a lath and means to move such lath lengthwise and in the plane of the path of the spudding element as the tobacco is spudded.

2. A tobacco harvesting machine having a spudding table, a movable spudding element, means to support the lath, and step-by-step mechanism to move such lath-supporting means.

3. In a machine of the class described, the combination of a spudding table, a movable element thereon having a clamp and a rack bar, such clamp serving to support a lath, a movable spudding element to coact with the spudding table, a pinion engaging such rack bar, and step-by-step mechanism to rotate such table.

4. In a machine of the class described and having a spudding table, an element movable on such table and having a rack bar and a clamp, the latter to secure a lath for the purpose set forth, a spudding arm mounted for oscillation, a shaft, means to rotate the same, operating means for the spudding arm connecting the latter to such shaft, a pinion engaging such rack bar, and step-by-step mechanism operated by such shaft to turn such pinion, for the purpose set forth.

5. In a machine of the class described, a spudding table, a spudding element movable back and forth with respect to such table, an element movable on such table, and having a rack bar and a clamp, the latter to engage and support a lath for the purpose set forth, a shaft having a pinion engaging such rack bar and further provided with a pair of ratchet wheels, a rocking arm having a pawl to coact with one of such ratchet wheels, a detent pawl to engage the other ratchet wheel, a shaft, means actuated thereby to oscillate such rocking arm and actuate such spudding element, and means also actuated by the last mentioned shaft to trip such detent pawl once at each rotation of such shaft.

6. A tobacco harvesting mechanism having a spudding table, a cutting mechanism, an elevator to deliver the cut tobacco on the spudding table, a reciprocating spudding element, movable means to support a lath, driving means for the cutting mechanism, elevator and spudding element, said driving means including means to vary the speed of the elevator, and step by step mechanism to move the lath support and cause the lath supported thereby to move lengthwise and in the plane of the path of the spudding element as the tobacco is spudded.

In testimony whereof, we affix our signatures in presence of two witnesses.

GEORGE A. SHORT.
OZELL RECK.

Witnesses:
SAMUEL K. YOUNT,
U. G. EARNEST.